3,423,024
FLOW RESTRICTOR FOR LAWN SPRINKLER
Frederick Morawetz, Oak Park, Ill., assignor to Sunbeam Corporation, Chicago, Ill., a corporation of Illinois
Filed Nov. 3, 1966, Ser. No. 591,730
U.S. Cl. 239—242
Int. Cl. B05b *3/16;* F16k *51/00*
8 Claims

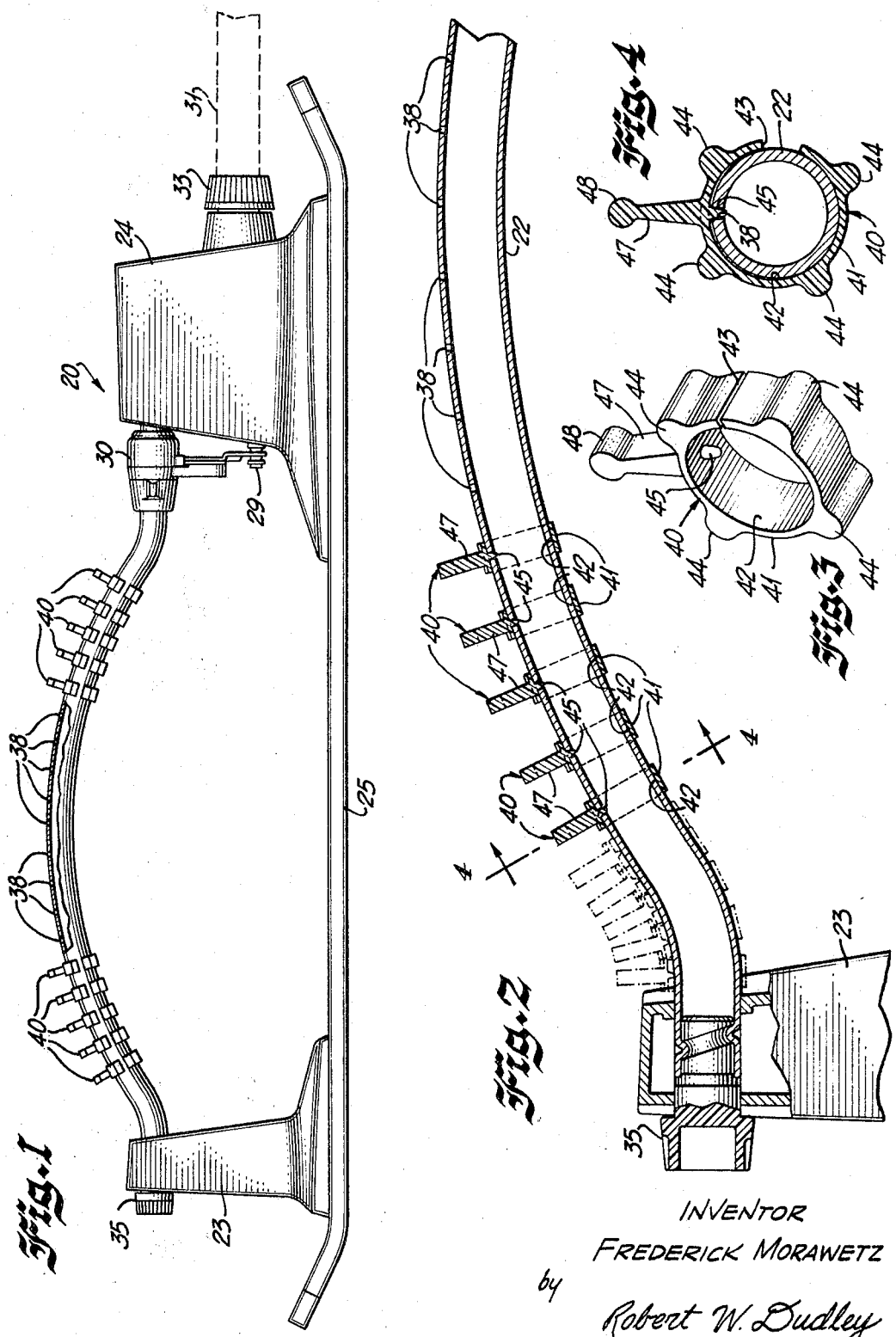

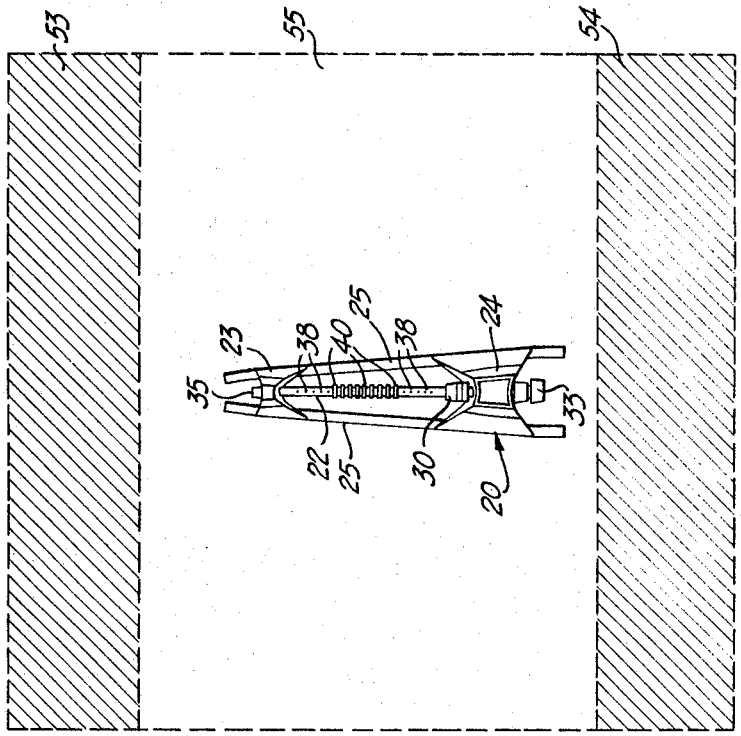
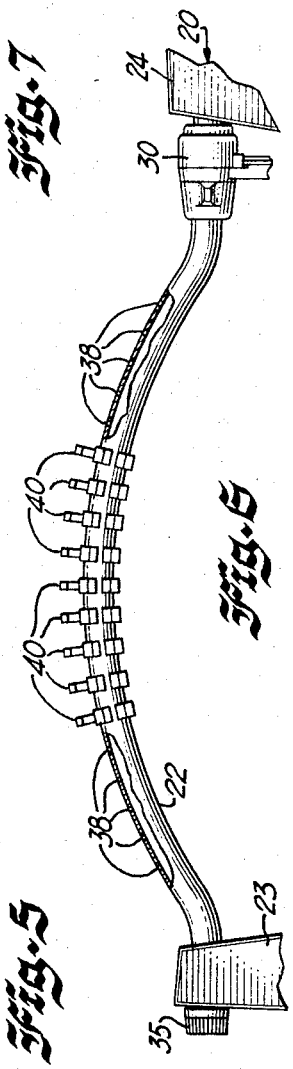
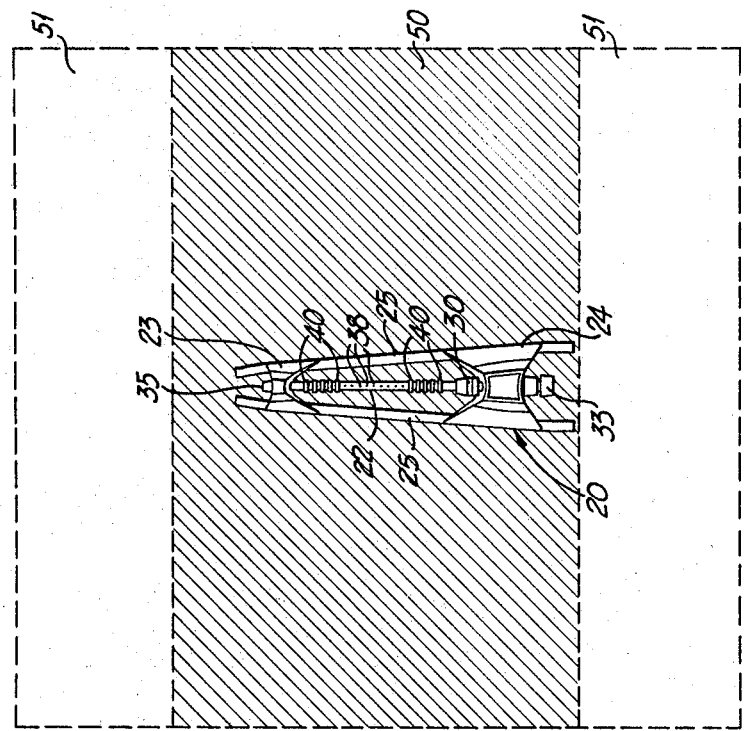
INVENTOR
FREDERICK MORAWETZ
by
Robert W. Dudley
ATTORNEY

United States Patent Office 3,423,024
Patented Jan. 21, 1969

ABSTRACT OF THE DISCLOSURE

Integral plastic flow restrictors for an oscillating lawn sprinkler having a spray tube with a series of spray apertures. The flow restrictors are assembled to the spray tube and adapted to slide therealong to selectively close a portion of the spray apertures for controlling the shape of the sprinkling pattern.

---

This invention relates to lawn sprinklers and more particularly to an improved oscillatory sprinkler capable of producing a variety of watering patterns.

In recent years, oscillatory sprinklers have become very popular due, in part, to their low cost and their ability to water in a number of rectangular patterns. Normally, commercial oscillatory sprinklers have a control mechanism permitting the user to select the angle of oscillation, that is, the arc through which the spray tube oscillates and the direction of oscillation, such as to the left, center or right. However, these sprinklers have not been able to regulate the length of the watering pattern or separate the pattern into individual portions. By way of definition in this application, the length of the watering pattern is the distance of the patter measured parallel to the longitudinal axis of the sprinkler spray tube while the width of the pattern is the distance thereof extending normal to the spray tube.

In the patented art, Jepson Patent No. 2,952,413 teaches the bending or bowing of a resilient oscillatory sprinkler spray tube in order to change the length of the watering pattern. In addition, Jepson Patent No. 3,270,-963 discloses an oscillatory sprinkler wherein the spray tube is pivotally mounted so that the longitudinal axis of the spray tube can be disposed at various angles with respect to the axis of oscillation thereby regulating the length of the sprinkling pattern. Both of these prior art approaches are based on sound engineering practices and are significant steps forward in the art. However, both of these sprinklers require major design changes in present oscillatory sprinklers and, consequently, necessitate substantial capital expenditures to produce. Moreover, the watering patterns obtained with these units are limited to unitary shapes.

In certain instances, it is desirable to water in separated areas such as the bands of lawn on both sides of a driveway, garden or the like. Furthermore, it would be advantageous to have an oscillatory sprinkler capable of watering separate areas of unequal size.

Therefore, there is a need for means which is applicable to present oscillatory sprinklers for changing the length of the watering pattern and which requires little, if any, changes in the present sprinklers. This means should be inexpensive and permit great variety in watering patterns, even the selection of separated patterns wherein both the distance between the patterns and the size of the patterns can be selectively changed.

Accordingly, it is an object of the present invention to provide an oscillatory sprinkler wherein the length of the watering pattern can be varied and said sprinkler is easily and inexpensively manufactured.

Another object of the present invention is to provide an oscillatory sprinkler with adjustment means for selectively changing the length of the watering pattern and separated patterns can be selected with variability in the size of the patterns and the spacing between the patterns.

Still another object of the present invention is to provide valve means which is adapted for use with prior art oscillatory sprinklers and which selectively regulates the length of the watering pattern and said valve means being inexpensive to manufacture.

A further object of the present invention is to provide valve means which is easily mounted on the spray tube of an oscillatory sprinkler and slidable therealong for regulating the flow of water egressing through the spray tube discharge apertures.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a side elevational view of a sprinkler embodying the present invention;

FIG. 2 is an enlarged fragmentary vertical section view taken substantially along line 2—2 of FIG. 1;

FIG. 3 is a perspective view of a flow restrictor;

FIG. 4 is an enlarged sectional view taken substantially along line 4—4 of FIG. 2;

FIG. 5 is a top plan view view of the subject sprinkler and the watering pattern obtained when the flow restrictors are disposed over the spray apertures located near the ends of the spray tube;

FIG. 6 is a fragmentary elevational view similar to FIG. 1 except that the flow restrictors are disposed over the apertures position at the center of the spray tube; and FIG. 7 is a plan view illustrating the watering pattern obtained when the flow restrictors are disposed as indicated in FIG. 6.

Briefly, the present invention relates to an oscillatory sprinkler having a pivotally supported spray tube with a series of discharge apertures spaced along its length. The spray tube is oscillated by means of a water operated motor secured to the sprinkler. A number of flow controls are mounted on the spray tube and are movable to different positions thereon. Each of the flow controls includes a valve element adapted for cooperating with the tube apertures for governing the water flow therethrough. Biasing means is provided on each flow control for urging the valve element toward the tube aperture so that when the element is positioned over an aperture, the element will prevent water from egressing through said aperture.

Referring to the drawings in which like numerals designate like parts throughout the several views, the oscillatory sprinkler is designated generally by the reference numeral 20. As illustrated in FIG. 1, the sprinkler includes a spray tube 22 which is pivotally supported near one end by a rear upright 23 and at the other end by housing 24. Both the rear upright 23 and the housing 24 are secured to a pair of longitudinally extending frame members 25. Disposed within the housing 24 is a standard water powered motor (not illustrated) and may be similar to that depicted in Jepson Patent No. 3,105,639. The water motor is operated by the flow of water through the housing and the water motor rotates crank 29 which extends through the housing 24 and which is generally parallel to the spray tube 22. The rotation of crank 29 causes the spray tube 22 to oscillate due to control mechanism 30 which extends between the crank and the tube. The operation of control mechanism 30 is disclosed in detail in the Jepson Patent No. 3,105,639. It should be appreciated, however, that the control mechanism 30 regulates the angle through which the spray tube 22 oscillates and also the general direction of oscillation. Thus, the user can selectively control the angle of oscillation and the direction of watering. However, if limited merely to the use of the control mechanism 30, the user cannot regulate the length of the watering pattern. The length dimension of the pattern has been defined hereinbefore.

In order for water to flow into the housing 24 under pressure, a standard garden hose 31 indicated by broken lines in FIG. 1, is attached to a housing coupling 33 whereby the water passes through the internal water motor and subsequently passes into the spray tube 22. One end of the spray tube 22 is in fluid communication with the housing 24 and the other end of the spray tube is closed by plug 35 which is in threaded engagement with the tube. For permitting the water to leave the spray tube 22, there is provided a plurality of spaced discharge apertures 38 extending in an in-line arrangement along the longitudinal axis of the tube. So that the water sprayed from the tube 22 will diverge forming a rectangular pattern of suitable length, the tube 22 is formed with a slight curvature so that the discharge apertures 38 near the ends of the tube 22 are angled laterally with respect to the tube longitudinal axis. In the present embodiment, the spray tube 22 has nineteen discharge apertures, each of which has a diameter of approximately .050 inch. It is appreciated by those skilled in the art that enough apertures are necessary to insure that sufficient flow of water through the water motor is obtained in order to properly operate the motor. In addition, a sufficient number of apertures are needed in order to prevent too high of a water pressure build up within the spray tube 22 so that fogging will not occur. It is recognized that fogging is detrimental to the operation of an oscillatory sprinkler since fogged water particles are easily carried away by the wind and, consequently, the water does not land on the selected areas.

In accordance with the present invention, spray tube 22 is provided with a plurality of flow controls or restrictors 40 which are preferably formed from a suitable plastic material such as a polycarbonate which has the characteristic of resiliency even when exposed to severe weathering for long periods of time. The purpose of the flow restrictors is to regulate the length of the watering pattern. Each restrictor 40 has an annular portion 41 with a bore 42 which is interrupted by a longitudinally extending slit 43 passing completely through one side thereof. To facilitate the removal of the plastic restrictor 40 from the molding die, the annular portion 41 is provided with ejection pads 44. Formed on the bore surface 42 is an inwardly extending valve element 45 having a conical configuration with the large diameter end being adjacent to the bore surface 42. Extending outwardly from the annular portion 41 immediately opposite the valve element 45 is a valve actuator 47 having an enlarged remote end 48 to facilitate the gripping of the actuator. As can be seen in FIG. 4, the restrictor bore 42 receives the spray tube 22 and the outside diameter of the spray tube is larger than the bore 42 causing the slit 43 to be opened further after the restrictor is inserted on the tube. The thickness of the restrictor annular portion 41 is such to allow the slit 43 to open sufficiently to permit the insertion of the restrictor onto the tube 22 and, at the same time, to be sufficiently thick to insure a biasing force on the valve element 45 urging it inwardly toward the tube 22. However, the biasing force on the restrictor is not sufficient to prevent the restrictor from easily sliding longitudinally along the tube 22.

In the present embodiment, ten flow restrictors 40 are disposed along the spray tube 22. If it is desired to use the length of the spray pattern which is governed by the operation of all nineteen tube apertures 38, the restrictors are slid to storage positions near the ends of the spray tube 22 as illustrated in broken lines in FIG. 2. When it is desired to change this basic pattern, however, one or more of the restrictors 40 can be slid along the tube and positioned so that the valve element 45 is disposed immediately above one of the apertures 38. Since the restrictor is constructed so that there is a biasing force urging the valve element 45 downwardly, the valve element enters into the aperture preventing the egression of water therethrough. The inwardly biasing force on valve element 45 is sufficiently great to overcome the water pressure tending to move it outwardly. The valve element 45 is formed so that the large diameter thereof adjacent to the bore 42 is larger than the diameter of the aperture so that there is an effective valve seal between the spray tube aperture and the side of the conically shaped valve element 45. To improve the effectiveness of the seal between the valve element 45 and the aperture 38, the restrictor 40 is formed from material which is sufficiently resilient to permit the valve element 45 to conform to slight irregularities in the shape of the aperture 38. To facilitate the arranging of the flow restrictor 40, the width of the restrictor is less than the space between adjacent apertures 38 so that adjacent apertures 38 may be sealed off.

In operation, the user may select the watering pattern which is governed by the use of all the spray apertures 38 by moving the restrictors 40 so that they are in the storage areas at the ends of the spray tube 22 whereby none of the restrictor valve elements 45 are cooperating with apertures 38. If the user decides to employ a watering pattern having a shorter length, he merely grasps a given number of restrictors 40 by their valve actuators 47 and moves the valve element 45 over a given aperture 38. Upon releasing the valve actuator 47, the valve element 45 is biased inwardly to establish an effective water seal, thereby preventing water from egressing from the subject aperture. As illustrated in FIG. 5, the restrictors have been placed over the apertures 38 near the ends of the spray tube 22 causing a shorter length of pattern area 50. If no restrictors are used, the watering pattern would be as indicated by the large square illustrated by the peripheral broken lines. That is to say, this area would include area 50 plus side areas 51. It should be appreciated that the length of the pattern may be varied considerably by varying the number of restrictors employed. A separated watering pattern can be obtained by employing the restrictors in the center of the tube apertures as illustrated in FIG. 7. When employed thusly, water egresses only from the apertures near the ends of the spray tube causing the water to sprinkle only on spaced areas 53 and 54 while leaving area 55 relatively dry. Obviously, if more restrictors are placed toward the rear upright 23, then area 54 would be larger than area 53. Also, if less restrictors are placed in the center, then area 55 would be smaller. Therefore, the space between watered areas can be selectively controlled as well as the length of each separated watered area. It should be appreciated that more than two separated watered areas are possible with proper positioning of the restrictors. In the present embodiment having nineteen spray apertures and ten restrictors, it is possible to have in excess of 300,000 different watering patterns allowing the user great flexibility in controlling the precise area to be watered.

While there has been illustrated and described a preferred embodiment of the present invention, it is not desired that the invention be limited only to the construction shown and described for it will, of course, be obvious to those skilled in the art that changes and modifications may be made without departing from the invention and it is, therefore, aimed in the appended claims to cover all such changes and modifications as fall within the true spirit and scope of this invention.

What is considered new and desired to be secured by Letters Patent of the United States is:

1. A sprinkler comprising a frame pivotally supporting a spray tube having a plurality of longitudinally disposed discharge apertures, a water operated power means secured to said frame for oscillating said tube, control means mounted on said tube and slidable thereon to different longitudinal positions, said control means including an integral flow restrictor molded of plastic having an inwardly projecting valve element adapted for cooperating with said apertures for regulating the flow therethrough, and said restrictor having biasing means for urging said valve element toward said tube aperture so that when said valve element is positioned over said aperture said element is biased inwardly into sealing engagement with said tube aperture, said biasing means being sufficiently strong to maintain said valve element in sealing engagement with said tube aperture during the operation of the sprinkler.

2. The sprinkler of claim 1 wherein said restrictor is formed from resilient plastic material so that said valve element tends to conform to the configuration as said aperture under the influence of said biasing means.

3. The sprinkler of claim 2 wherein said valve element has a conical shape and said apertures are circular, said valve element conical shape having a base diameter which is equal to or greater than said aperture diameter.

4. The sprinkler of claim 3 wherein said restrictor includes a valve actuator extending outwardly opposite said valve element whereby the user can withdraw said valve element from said tube aperture by pulling said valve actuator outwardly and said actuator facilitates the longitudinal movement of said restrictor along said tube.

5. The sprinkler of claim 4 wherein said control means extends along said tube a distance less than the distance between adjacent apertures.

6. The sprinkler of claim 1 wherein said restrictor having a ring shape with one side being slit and the slit extending longitudinally with respect to said tube, said restrictor before insertion onto said tube having a bore which is less than the diameter of said tube so that said restrictor slit becomes greater after said restrictor is assembled on said tube, the number of said restrictors being less than the number of said tube apertures.

7. An integral plastic flow restrictor for use with a lawn sprinkler of the type including a tube having a series of spray apertures disposed along its length comprising an annular body having a bore portion formed with an inwardly extending valve element, said bore portion being adapted for receiving the sprinkler tube, said body being resilient so that said valve element is biased inwardly when said body is mounted on the sprinkler tube, said body being adapted for sliding along said tube, said valve element having a conically shaped portion with the smaller diameter end facing inwardly so that said valve element can establish a water seal with the spray aperture.

8. The flow restrictor of claim 7 wherein said body is provided with a valve actuator adapted for moving said valve element with respect to the sprinkler tube aperture, and said body being ring-shaped with a slit therethrough for permitting the assembly of the restrictor on the sprinkler tube.

References Cited

UNITED STATES PATENTS

| | | |
|---|---|---|
| 150,595 | 5/1874 | McKenzie. |
| 379,392 | 3/1888 | Haines. |
| 703,327 | 6/1902 | White _____ 239—562 X |
| 1,517,664 | 12/1924 | Bergquist _____ 239—563 X |
| 1,657,538 | 1/1928 | Koepf _____ 239—563 X |
| 3,010,478 | 11/1961 | Buck et al. _____ 138—92 X |
| 3,115,305 | 12/1963 | Rinkewich _____ 239—242 |
| 3,275,242 | 9/1966 | Thompson _____ 239—242 X |
| 3,282,509 | 11/1966 | Starr _____ 239—242 |

M. HENSON WOOD, Jr., *Primary Examiner.*

HOWARD NATTER, *Assistant Examiner.*

U.S. Cl. X.R.

137—608; 138—92; 239—562, 563, 569; 251—145